(12) United States Patent
Kim

(10) Patent No.: US 8,723,901 B2
(45) Date of Patent: *May 13, 2014

(54) LIQUID CRYSTAL DISPLAY AND METHOD OF DRIVING THE SAME

(75) Inventor: Dong-gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1213 days.

This patent is subject to a terminal disclaimer.

(21) Appl. No.: 12/163,067

(22) Filed: Jun. 27, 2008

(65) Prior Publication Data

US 2009/0015741 A1 Jan. 15, 2009

(30) Foreign Application Priority Data

Jul. 13, 2007 (KR) .................. 10-2007-0070845

(51) Int. Cl.
*G09G 5/02* (2006.01)

(52) U.S. Cl.
USPC ............. 345/695; 345/691; 345/694; 349/38; 349/39; 349/138; 349/144

(58) Field of Classification Search
USPC ..................... 345/84–102; 349/33, 139–152; 377/64–81
See application file for complete search history.

(56) References Cited

U.S. PATENT DOCUMENTS

| | | | | |
|---|---|---|---|---|
| 4,840,460 A * | 6/1989 | Bernot et al. | ................. | 349/144 |
| 5,111,319 A * | 5/1992 | Morris | ............................. | 345/95 |
| 5,610,739 A * | 3/1997 | Uno et al. | ........................ | 349/39 |
| 5,798,745 A * | 8/1998 | Steffensmeier | ................. | 345/92 |
| 6,657,266 B2 * | 12/2003 | Hirai et al. | ..................... | 257/393 |
| 6,922,183 B2 * | 7/2005 | Ting et al. | ........................ | 345/87 |
| 6,954,904 B2 * | 10/2005 | White | ............................. | 715/763 |
| 7,589,703 B2 * | 9/2009 | Su | ..................... | 345/87 |
| 7,936,407 B2 * | 5/2011 | Kim et al. | ...................... | 349/39 |
| 8,049,700 B2 * | 11/2011 | Kim | ................................ | 345/90 |
| 2002/0005846 A1 * | 1/2002 | Hiroki et al. | .................. | 345/204 |
| 2003/0016071 A1 * | 1/2003 | Nagano et al. | ................. | 327/407 |
| 2005/0073511 A1 * | 4/2005 | Yang | ............................. | 345/204 |
| 2005/0122441 A1 * | 6/2005 | Shimoshikiryoh | ............. | 349/38 |
| 2006/0066797 A1 * | 3/2006 | Baek | ............................. | 349/139 |

(Continued)

FOREIGN PATENT DOCUMENTS

| | | |
|---|---|---|
| JP | 10-123501 | 5/1998 |
| JP | 2007-041578 | 2/2007 |
| KR | 1020070010549 | 1/2007 |

*Primary Examiner* — Alexander Eisen
*Assistant Examiner* — Sanjiv D Patel
(74) *Attorney, Agent, or Firm* — Innovation Counsel LLP

(57) ABSTRACT

A liquid crystal display (LCD) comprises a gate line formed on a first insulation substrate and extending in a first direction; a data line insulated from the gate line and extending in a second direction; a pixel electrode comprising a first sub-pixel electrode connected to the gate line and the data line and a second sub-pixel electrode connected to the gate line and the data line; first and second voltage lines receiving a pair of voltages having opposite phases, from an external source; and first and second storage lines respectively overlapping the first and second sub-pixel electrodes and respectively receiving first and second storage voltages whose phases are inverted at a cycle of at least one frame, wherein the first storage line is connected to the first and second voltage lines by a first switching unit, the second storage line is connected to the first and second voltage lines by a second switching unit, and the first and second switching units apply the pair of voltages to the first and second storage lines as the first and second storage voltages.

18 Claims, 8 Drawing Sheets

(56) References Cited

U.S. PATENT DOCUMENTS

| | | | |
|---|---|---|---|
| 2006/0208984 A1* | 9/2006 | Kim et al. | 345/90 |
| 2006/0231838 A1* | 10/2006 | Kim | 257/59 |
| 2006/0279677 A1* | 12/2006 | Matsushima | 349/114 |
| 2007/0008263 A1* | 1/2007 | Kim | 345/87 |
| 2008/0068524 A1* | 3/2008 | Kim | 349/38 |
| 2008/0150928 A1* | 6/2008 | Van Der Hoef et al. | 345/210 |
| 2008/0204613 A1* | 8/2008 | Kim et al. | 349/33 |

* cited by examiner

LIQUID CRYSTAL DISPLAY AND METHOD OF DRIVING THE SAME

REFERENCE TO RELATED APPLICATIONS

This application claims priority from Korean Patent Application No. 10-2007-0070854 filed on Jul. 13, 2007 in the Korean Intellectual Property Office, the disclosure of which is incorporated herein by reference in its entirety.

BACKGROUND OF THE INVENTION

1. Field of the Invention

The present invention relates to a liquid crystal display (LCD) and a method of driving the same, and more particularly, to an LCD which can be driven at high speed and have better lateral visibility and a method of driving the LCD.

2. Description of the Related Art

Generally, an LCD includes a pair of display panels having electric field generating electrodes, such as pixel electrodes and common electrodes with a liquid crystal layer interposed between the display panels. The alignment of the liquid crystal molecules of the liquid crystal layer is determined by the electric field applied between the electrodes. The applied electric field controls the polarization of incident light. As a result, a desired image is displayed on the LCD.

A vertical alignment (VA) mode LCD aligns the main directors of the liquid crystal molecules perpendicular to the upper and lower display panels when no electric field is applied. VA mode LCDs are popular due to their high contrast ratios and wide standard viewing angles. However, VA mode LCDs tend to have poor lateral visibility compared to front visibility. To provide better lateral visibility, each pixel is partitioned into two sub-pixels, and a switching device is formed in each of the sub-pixels. Then, a different voltage is applied to each of the sub-pixels, thereby controlling the alignment of liquid crystal molecules.

An LCD may be supplied with an alternating current (AC) driving voltage having opposite phases for every horizontal time period. The driving voltages are applied to storage lines that overlap a pair of sub-pixels. Then, the amplitude of the voltage applied to each sub-pixel is controlled using the capacitance between each sub-pixel and a corresponding storage line.

Recently, a method of driving an LCD at high speed, for example, at a 120 Hz frame rate, has been used to improve motion blur.

However, if an LCD is driven at high speed, the horizontal time period of the LCD is shortened, which, in turn, increases the RC delay of a storage line and may adversely affect image quality.

SUMMARY OF THE INVENTION

The present invention provides a liquid crystal display (LCD) which can be driven at high speed and have better lateral visibility.

According to an aspect of the present invention, an LCD comprises a gate line formed on a first insulation substrate and extending in a first direction; a data line insulated from the gate line and extending in a second direction; a pixel electrode comprising a first sub-pixel electrode connected to the gate line and the data line and a second sub-pixel electrode connected to the gate line and the data line; first and second voltage lines receiving a pair of voltages having opposite phases, from an external source; and first and second storage lines respectively overlapping the first and second sub-pixel electrodes and respectively receiving first and second storage voltages whose phases are inverted at a cycle of at least one frame, wherein the first storage line is connected to the first and second voltage lines by a first switching unit, the second storage line is connected to the first and second voltage lines by a second switching unit, and the first and second switching units apply the pair of voltages to the first and second storage lines as the first and second storage voltages.

According to another aspect of the present invention, a method of driving an LCD comprises applying a gate signal to a gate line; applying a data voltage to a data line to charge a pixel electrode comprised of first and second sub-pixel electrodes; applying first and second storage voltages, whose phases are inverted at a cycle of at least one frame, to first and second storage lines overlapping the first and second sub-pixel electrodes, respectively, wherein the applying of the first and second storage voltages comprises providing a pair of voltages having opposite phases from an external source, and applying the pair of voltages, which are selectively switched on by first and second switching units, to the first and second storage lines as the first and second storage voltages; and adjusting amplitudes of the data voltages charged in the first and second sub-pixel electrodes using the first and second storage voltages.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION

Figure 1:
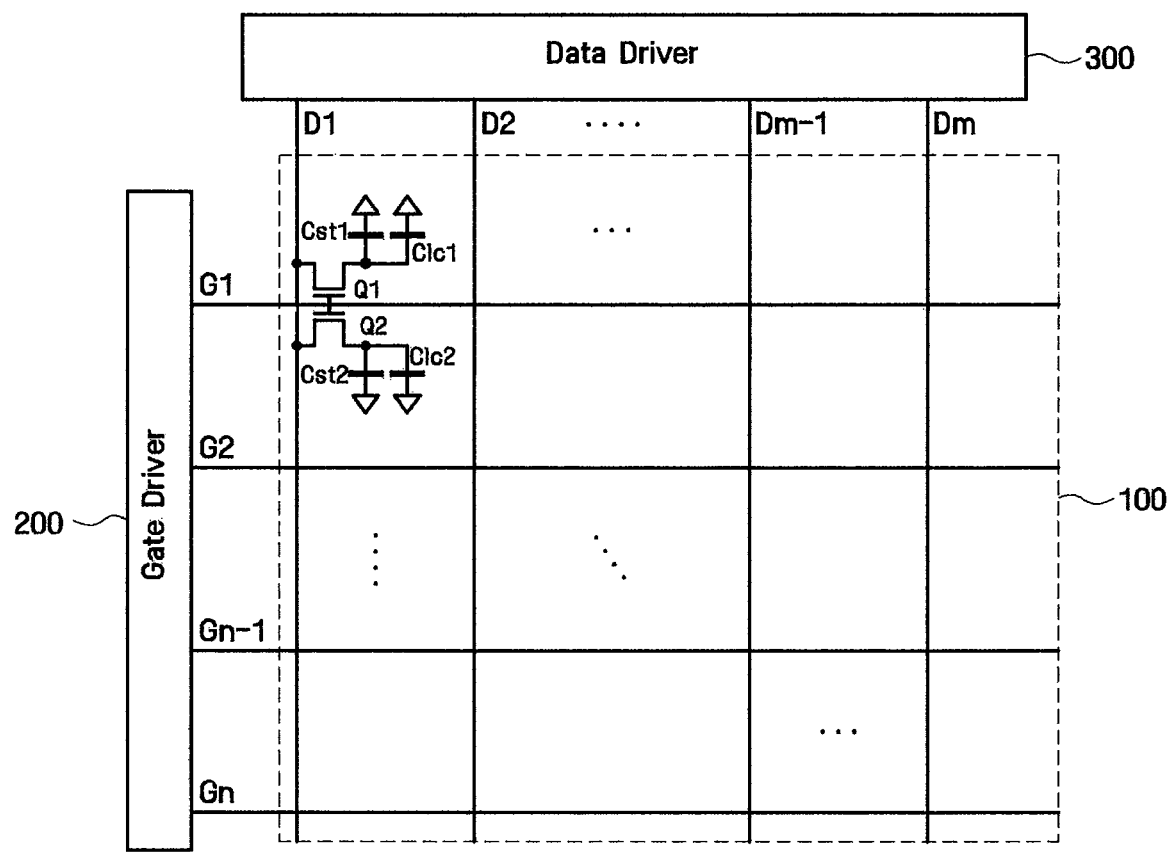
FIG. 1 schematically illustrates configuration of a liquid crystal display (LCD) according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, sizes and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

Hereinafter, a liquid crystal display (LCD) according to exemplary embodiments of the present invention will be described with reference to the attached drawings.

Figure 2:
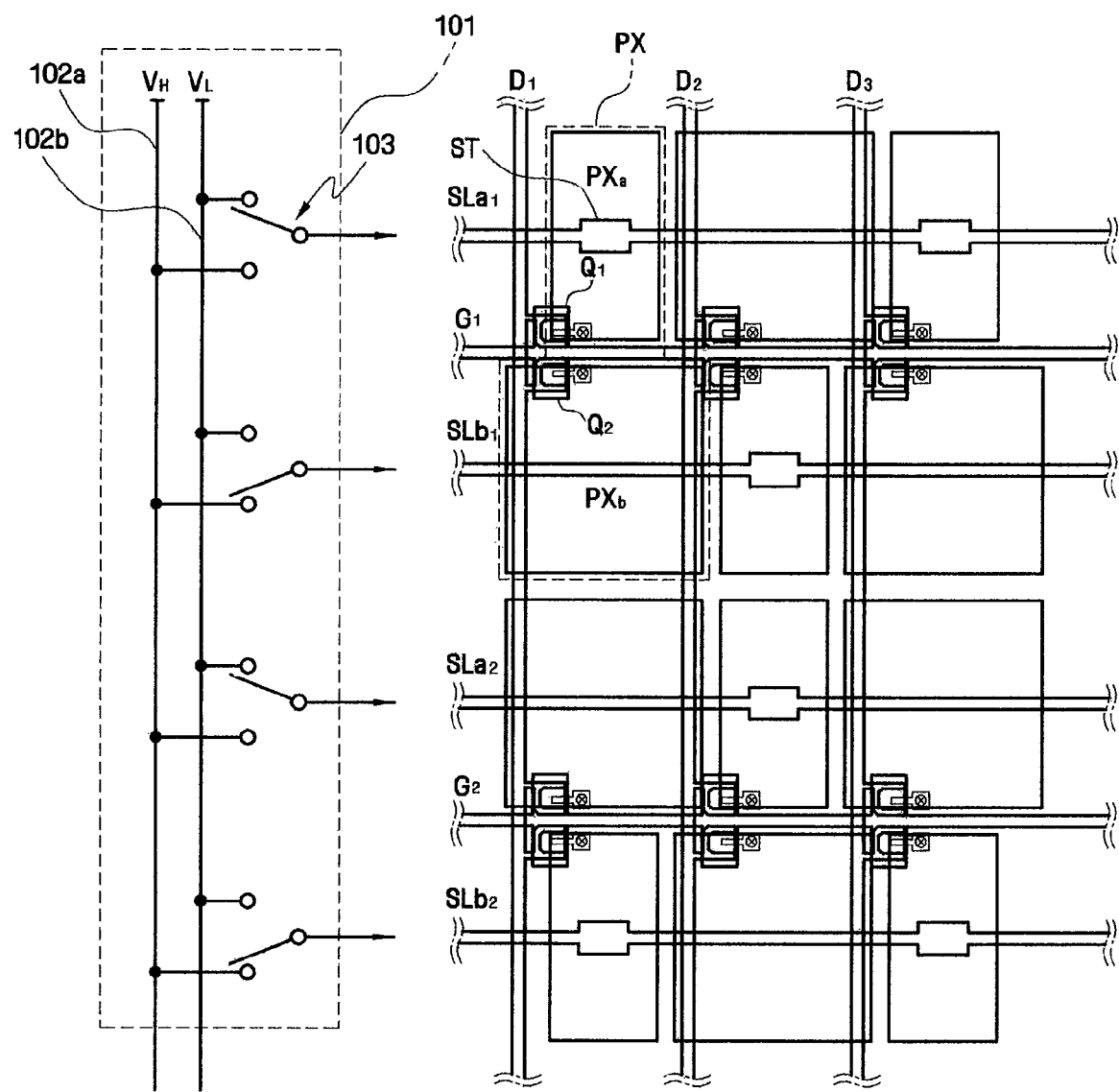
FIG. 2 schematically illustrates a pixel array of the LCD of FIG. 1

FIG. 1 schematically illustrates configuration of an LCD according to an exemplary embodiment of the present invention. FIG. 2 schematically illustrates a pixel array of the LCD of FIG. 1.

Referring to FIG. 1, the LCD according to the present embodiment includes a liquid crystal panel 100, a gate driver 200, and a data driver 300.

The liquid crystal panel 100 has a plurality of display signal lines. The display signal lines include a plurality of gate lines G1 through Gn and a plurality of data liens D1 through Dm. The gate lines G1 through Gn extend in a first direction, for example, a horizontal direction of the liquid crystal panel 100. The data lines D1 through Dm extend in a second direction, for example, a vertical direction of the liquid crystal panel 100, and intersect the gate lines G1 through Gn.

A plurality of pixels are connected to the gate lines G1 through Gn and the data lines D1 through Dm. Each of the pixels includes switching devices Q1 and Q2, which are connected to one of the gate lines G1 through Gn and one of the data lines D1 through Dm, and liquid crystal capacitors Clc1 and Clc2 and storage capacitors Cst1 and Cst2 which are connected to the switching devices Q1 and Q2.

The gate lines G1 through Gn transmit gate signals to the switching devices Q1 and Q2, and the data lines D1 through Dm apply data voltages, which correspond to data signals, to the switching devices Q1 and Q2.

Each of the switching device Q1 and Q2 is a three-terminal device that includes a control terminal connected to one of the gate lines G1 through Gn, an input terminal connected to one of the data lines D1 through Dm, and an output terminal connected to the liquid crystal capacitor Clc1 or Clc2 and the storage capacitor Cst1 or Cst2.

The liquid crystal capacitor Clc1 or Clc2 is connected between the output terminal of the switching device Q1 or Q2 and a common electrode (not shown). The storage capacitor Cst1 or Cst2 is connected between the output terminal of the switching device Q1 or Q2 and the common electrode. Alternatively, the storage capacitor Cst1 or Cst2 may be connected between the output terminal of the switching device Q1 or Q2 and one of the gate lines G1 through Gn immediately above the switching device Q1 or Q2.

The gate driver 200 is connected to the gate lines G1 through Gn and transmits gate signals to the gate lines G1 through Gn in order to activate the switching devices Q1 and Q2.

The data driver 300 is connected to the data lines D1 through Dm and applies data voltages, which correspond to data signals, to the pixels through the data lines D1 through Dm, respectively.

The switching devices Q1 and Q2 may be metal oxide semiconductor (MOS) transistors, and the MOS transistors may be implemented as thin-film transistors having channel regions made of polysilicon.

The LCD according to the present embodiment will be described in more detail with reference to FIG. 2.

A lower display panel 1 (see FIG. 8) of the liquid crystal panel 100 includes a plurality of display signal lines. The display signal lines include a plurality of gate lines G1 and G2 and a plurality of data lines D1 through D3.

The gate lines G1 and G2 transmit gate signals, extend in a horizontal direction of the lower display panel, and are substantially parallel to each other. The data lines D1 through D3 apply data voltages, extend in a vertical direction of the lower display panel, and are substantially parallel to each other.

Each pixel PX includes a pair of sub-pixels, i.e., first and second sub-pixels PXa and PXb. The first and second sub-pixels PXa and PXb face each other with the gate line G1 therebetween. The first and second sub-pixels PXa and PXb may be connected to the switching devices Q1 and Q2, respectively, which are connected to substantially the same data line D1 and the same gate line G1.

The first and second sub-pixels PXa and PXb may have different sizes. For example, the first sub-pixel PXa disposed above the second sub-pixel PXb with the gate line G1 therebetween may be smaller than the second sub-pixel PXb disposed under the first sub-pixel PXa.

The first and second sub-pixels PXa and PXb of adjacent pixels PXs may be arranged in an alternating fashion. For example, the first and second sub-pixels PXa and PXb of a plurality of pixels PXs arranged in the horizontal direction of the lower display panel, that is, along the data lines D1 through D3, may be arranged in an alternating fashion. In addition, the first and second sub-pixels PXa and PXb of a plurality of pixels PXs arranged in the vertical direction of the lower display panel, that is, along the gate lines G1 and G2, may be arranged in an alternating fashion. Consequently, when the LCD is driven, visibility degradation due to a layout difference between the first and second sub-pixels PXa and PXb can be reduced.

A pair of storage lines, i.e., first and second storage lines SLa1 and SLb1 or third and fourth storage lines SLa2 and SLb2, are respectively arranged with the gate line G1 or G2 therebetween and extend substantially parallel to each other. Each of the first through fourth storage lines SLa1, SLb1, SLa2 and SLb2 overlaps the first or second sub-pixel PXa or PXb and forms a storage capacitor together with the first or second sub-pixel PXa or PXb.

Predetermined voltages, for example, a pair of voltages higher and lower than a common voltage Vcom, may be applied from an external source to the first through fourth storage lines SLa1, SLb1, SLa2 and SLb2 as storage voltages. The first and second storage lines SLa1 and SLb1 respectively overlapping the first and second sub-pixels PXa and PXb form storage capacitors.

When the LCD is driven, the storage capacitors and liquid crystal capacitors sustain voltages, i.e., the data voltages charged in the first and second sub-pixels PXa and PXb. The storage capacitors adjust the amplitudes of the data voltages charged in the first and second sub-pixels PXa and PXb once during at least one frame operation of the LCD, so that the first and second sub-pixels PXa and PXb can have different amplitude data voltages. Consequently, lateral visibility of the LCD is enhanced. Such a method of driving the LCD will be described in detail later with reference to FIGS. 9 and 10.

Referring back to FIG. 2, at least one storage electrode ST may be formed in the first through fourth storage lines SLa1, SLb1, SLa2 and SLb2. For example, the storage electrode ST having a large width may overlap the first sub-pixel PXa. Since the storage electrode ST overlaps the first sub-pixel PXa, a storage capacitance between the first storage line SLa1 and the first sub-pixel PXa is larger than a storage capacitance between the first storage line SLa1 and the second sub-pixel PXb.

In the present embodiment, the storage electrode ST may overlap the first sub-pixel PXa. However, the storage electrode ST may overlap the first sub-pixel PXb.

The lower display panel 1 may include a storage voltage unit 101 connected to the first through fourth storage lines SLa1, SLb1, SLa2 and SLb2. The storage voltage unit 101 may apply voltages of different sizes to the first through fourth storage lines SLa1, SLb1, SLa2 and SLb2, respectively.

Specifically, the storage voltage unit 101 may include a first voltage line 102a, a second voltage line 102b, and a switching unit 103.

The first and second voltage lines 102a and 102b receive voltages of different sizes, for example, a pair of voltages $V_H$ and $V_L$ having opposite phases, from an external source. The voltage $V_H$ applied to the first voltage line 102a may be higher than the common voltage Vcom, and the voltage $V_L$ applied to the second voltage line 102b may be lower than the common voltage Vcom.

There may be substantially the same voltage difference, for example, a voltage difference of approximately 2 to 2.5 V, between the common voltage Vcom and each of the voltages $V_H$ and $V_L$ applied to the first and second voltage lines 102a and 102b, respectively.

The switching unit 103 may be interposed between each of the first through fourth storage lines SLa1, SLb1, SLa2 and SLb2 and the first and second voltage lines 102a and 102b. The switching unit 103 may selectively switch on the voltages $V_H$ and $V_L$, which are supplied respectively to the first and second voltage lines 102a and 102b, and thus apply the storage voltages to each of the first through fourth storage lines SLa1, SLb1, SLa2 and SLb2.

That is, the switching unit 103 may electrically connect the first and second voltage lines 102a and 102b to each of the first through fourth storage lines SLa1, SLb1, SLa2 and SLb2. A first switching unit connected to the first storage line SLa1 may apply a pair of the voltages $V_H$ and $V_L$, which have opposite phases and are provided by the first and second voltage lines 102a and 102b, respectively, to the first storage line SLa1 as the first storage voltage.

In this case, the first switching unit may selectively switch on the pair of voltages $V_H$ and $V_L$ in response to a predetermined signal. Thus the first switching unit may apply the first storage voltage whose phase is inverted at a cycle of at least one frame to the first storage line SLa1. That is, the switching unit 103 may perform a switching operation once in a cycle of at least one frame in synchronization with gate signals applied to the gate lines G1 and G2. Accordingly, the pair of voltages $V_H$ and $V_L$ may be selectively switched on and thus the first storage voltage applied to the first storage line SLa1.

Similarly, a second switching unit connected to the second storage line SLb1 may apply a pair of the voltages $V_H$ and $V_L$, which have opposite phases and are provided by the first and second voltage lines 102a and 102b, respectively, to the second storage line SLb1 as the second storage voltage.

In this case, the second switching unit may selectively switch on the pair of voltages $V_H$ and $V_L$ in response to a predetermined signal. Thus the second switching unit may apply the second storage voltage whose phase is inverted at a cycle of at least one frame to the second storage line SLb1. That is, the switching unit 103 may perform a switching operation once in a cycle of at least one frame in synchronization with gate signals applied to the gate lines G1 and G2. Accordingly, the pair of voltages $V_H$ and $V_L$ may be selectively switched on and thus the second storage voltage applied to the second storage line SLb1.

Hereinafter, the operation of the above LCD will be described.

First of all, if a gate signal is applied to the first gate line G1, the switching devices Q1 and Q2 connected to the gate line G1 are turned on. When the switching devices Q1 and Q2 are turned on, data voltages provided by the data line D1 charge the first and second sub-pixels PXa and PXb.

The first and second storage lines SLa1 and SLb1 overlap the first and second sub-pixels PXa and PXb, respectively, and respectively receive the first and second storage voltage.

The voltage $V_L$ lower than the common voltage Vcom is applied to the first storage line SLa1 that overlaps the first sub-pixel PXa as the first storage voltage. In addition, the voltage $V_H$ higher than the common voltage Vcom is applied to the second storage line SLb1 that overlaps the second sub-pixel PXb as the second storage voltage.

If a gate signal is applied to the gate line G2, the switching devices Q1 and Q2 of the gate line G1 are turned off. In this case, the data voltages charged in the first and second sub-pixels PXa and PXb are sustained.

The switching unit 103 of the storage voltage 101 performs a switching operation once in synchronization with a gate signal applied to the gate line G2. Accordingly, the voltage $V_H$ may be applied to the first storage line SLa1 as the first storage voltage, and the voltage $V_L$ may be applied to the second storage line SLb1. The switching devices Q1 and Q2 may operate in synchronization with a rising edge of the gate signal that is applied to the gate line G2.

The first storage line SLa1 overlaps the first sub-pixel PXa charged with the data voltage. If the data voltage charged in the first sub-pixel PXa is higher than the common voltage Vcom, it may be increased by the voltage $V_H$ applied to the first storage line SLa1 after the switching operation of the switching unit 103. Therefore, the amplitudes of the data voltages charged in the first and second sub-pixels PXa and PXb may be adjusted differently, thereby enhancing lateral visibility of the LCD.

In addition, since the switching unit 103 performs the switching operation once during at least one frame operation of the LCD, the pair of voltages $V_H$ and $V_L$ are alternately applied to the first and second storage lines SLa and SLb1. Hence, even if the LCD operates at high speed, for example, at a speed of 120 Hz, the first and second storage lines SLa1 and SLb1 do not have a resistive-capacitive (RC) delay. Consequently, the LCD can be driven at high speed. The method of driving the LCD will be described in detail later with reference to FIGS. 9 and 10.

Hereinafter, the LCD according to the present embodiment will be described in more detail with reference to FIGS. 3 through 8.

Figure 3:
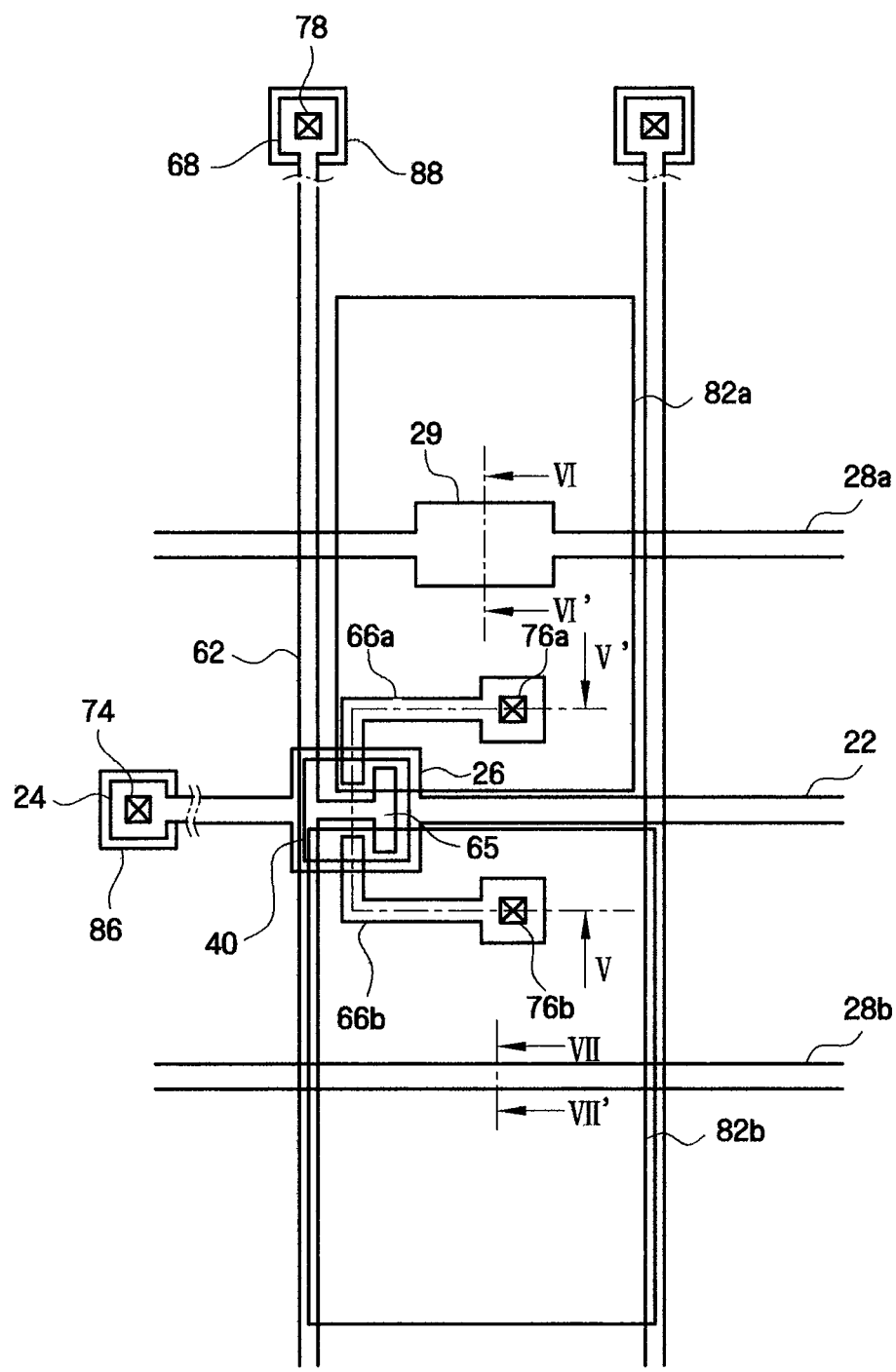
FIG. 3 is an arrangement plan of a lower display panel of the LCD according to an exemplary embodiment of the present invention.
Figure 4:
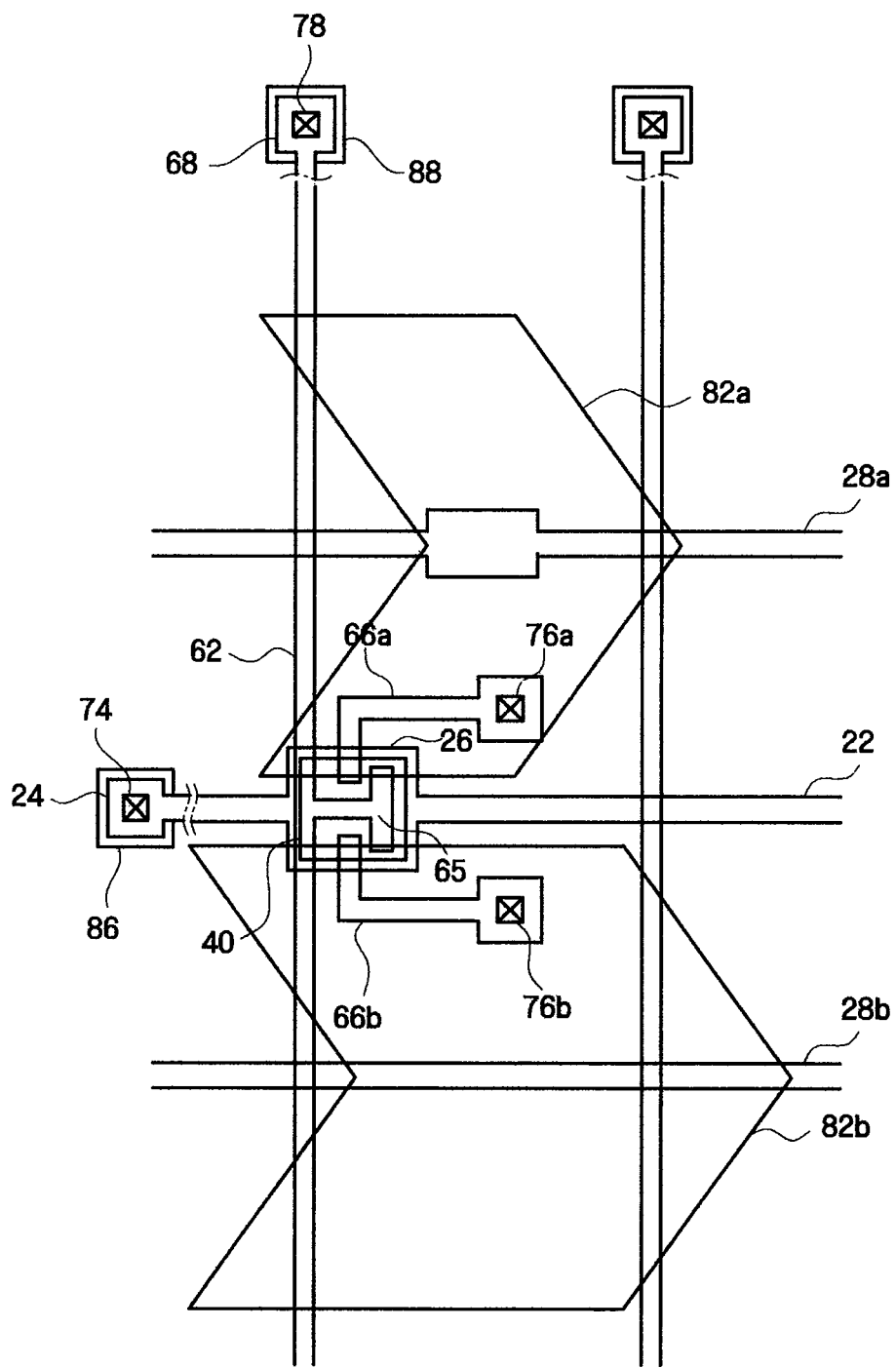
FIG. 4 is an arrangement plan of a lower display panel of the LCD according to another exemplary embodiment of the present invention.
Figure 5:
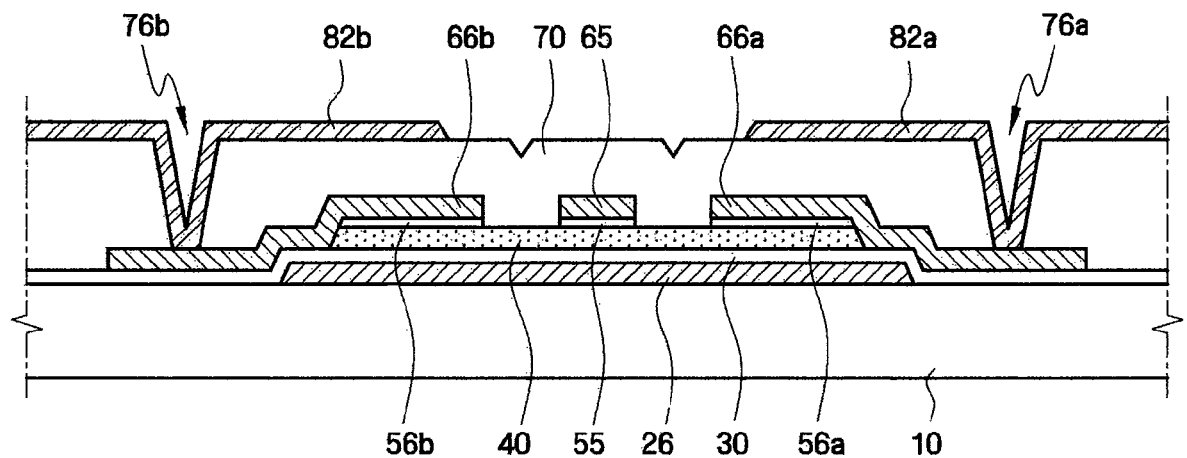
FIG. 5 is a cross-sectional view of the lower display panel taken along a line V-V' of FIG. 3.
Figure 6:
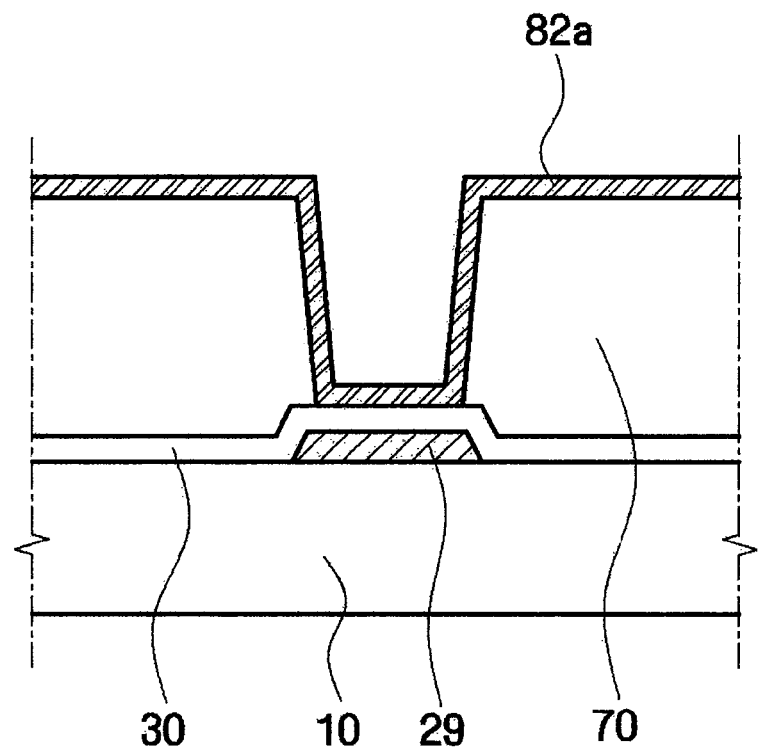
FIG. 6 is a cross-sectional view of the lower display panel taken along a line VI-VI' of FIG. 3.
Figure 7:
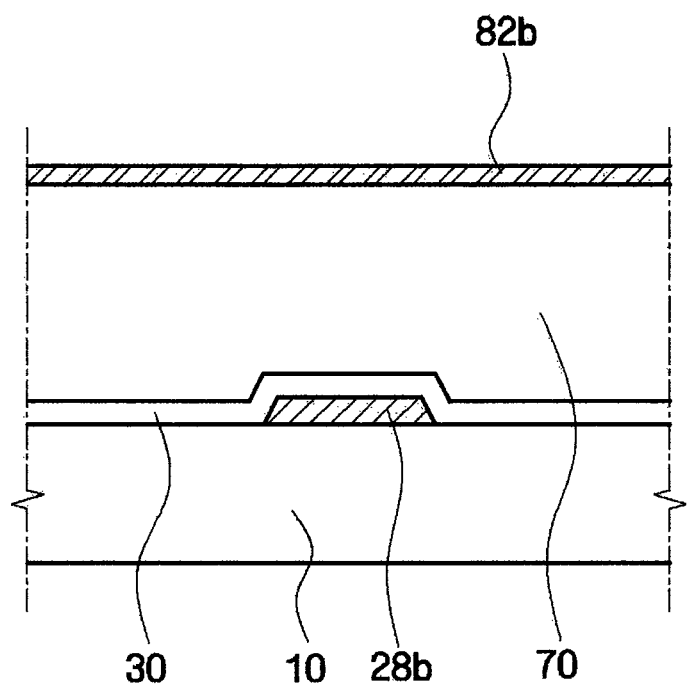
FIG. 7 is a cross-sectional view of the lower display panel taken along a line VII-VII' of FIG. 3.
Figure 8:
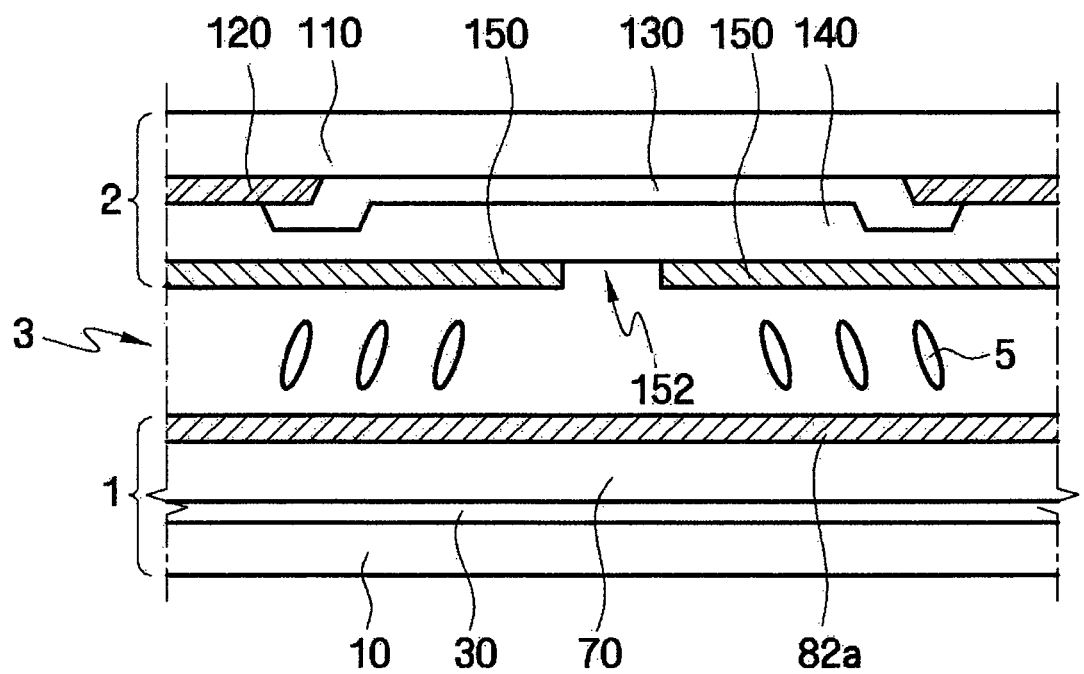
FIG. 8 is a cross-sectional view of the LCD including the lower display panel illustrated in FIG. 3.

First of all, the lower display panel 1 (see. FIG. 8) of the LCD according to the present embodiment will be described in detail with reference to FIGS. 3 through 7. FIG. 3 is an arrangement plan of the lower display panel 1 of the LCD according to an exemplary embodiment of the present invention. FIG. 4 is an arrangement plan of a lower display panel of the LCD according to another exemplary embodiment of the present invention. FIG. 5 is a cross-sectional view of the lower display panel 1 taken along a line V-V' of FIG. 3. FIG. 6 is a cross-sectional view of the lower display panel 1 taken along a line VI-VI' of FIG. 3. FIG. 7 is a cross-sectional view of the lower display panel 1 taken along a line VII-VII' of FIG. 3.

A gate line 22 is formed on an insulation substrate 10 which is made of, for example, transparent glass. The gate line 22 extends in a first direction, for example, a horizontal direction, and transmits a gate signal. The gate line 22 is allocated to each pixel. A gate electrode 26 having protrusions is formed in the gate line 22. The gate electrode 26 formed in the gate line 22 includes upper and lower protrusions that divide a pixel into two sub-pixels. A gate line end 24 is formed at an end of the gate line 22. The gate line end 24 receives a gate signal from another layer or an external source and transmits the received gate signal to the gate line 22. A width of the gate line end 24 is expanded in order for connection with an external circuit.

In addition, first and second storage lines 28a and 28b are formed on the insulation substrate 10. The first and second storage lines 28a and 28b extend across a pixel region in the horizontal direction and are substantially parallel to the gate line 22. A storage electrode 29 having a large width is connected to the first and second storage lines 28a and 28b. The first and second storage lines 28a and 28b may be arranged with the gate line 22 therebetween. That is, the first storage line 28a may be formed in a region above the gate line 22, for example, a region where a first sub-pixel electrode 82a is disposed, and thus overlap the first sub-pixel electrode 82a. The second storage line 28b may be formed in a region below the gate line 22, for example, a region where a second sub-pixel electrode 82b is disposed, and thus overlap the second sub-pixel electrode 82b.

In addition, the storage electrode 29 may be formed in the first storage line 28a and overlap the first sub-pixel electrode 82a, thereby forming a storage capacitor Cst that enhances a charge storage capacity of the pixel. In the method of driving the LCD, which will be described later, the storage capacitor Cst may adjust the size of the data voltage applied to the first sub-pixel electrode 82a.

Referring to FIG. 6, one or more passivation layers, for example, a gate insulation layer 30 and a passivation layer 70, may be formed between the first storage line 28a and the first sub-pixel electrode 82a. A portion of the passivation layer described above may be removed, and thus the first sub-pixel electrode 82a and the first storage line 28a may overlap each other. That is, the gate insulation layer 30 may be formed on the storage electrode 29 of the first storage line 28a, and the storage electrode 29 may overlap the first sub-pixel electrode 82a with the gate insulation layer 30 therebetween. Accordingly, the size of the storage capacitor Cst formed between the first sub-pixel electrode 82a and the first storage line 28a can be increased.

Referring to FIG. 7, one or more passivation layers, for example, the gate insulation layer 30 and the passivation layer 70, may be formed between the second storage line 28b and the second sub-pixel electrode 82b. In this case, the second storage line 28b and the second sub-pixel electrode 82b may overlap each other with the gate insulation layer 30 and the passivation layer 70 therebetween, thereby forming another storage capacitor Cst. The storage capacitor Cst formed by the second storage line 28b and the second sub-pixel electrode 82b overlapping each other may be relatively smaller than the storage capacitor Cst formed by the first storage line 28a and the first sub-pixel electrode 82a overlapping each other.

That is, referring to FIGS. 6 and 7, a region in which the first sub-pixel electrode 82a overlaps the storage electrode 29 of the first storage line 28a is relatively thinner than a region in which the second sub-pixel electrode 82b overlaps the second storage line 28b. Accordingly, the storage capacitor Cst formed by the first sub-pixel electrode 82a and the first storage line 28a overlapping each other may be relatively larger than the storage capacitor Cst formed by the second sub-pixel electrode 82b and the second storage line 28b overlapping each other. In the method of driving the LCD which will be described later, the effect of the storage capacitor Cst formed by the second sub-pixel electrode 82b and the second storage line 28b overlapping each other is omitted.

In the present embodiment, the first and second storage line 28a, 28b overlaps the center of the pixel region, that is, the centers of the first and second sub-pixel electrodes 82a and 82b. However, the present invention is not limited thereto, and the shape and disposition of the first and second storage line 28a, 28b may vary.

Referring FIGS. 3 through 7 The gate line 22, the gate electrode 26, and the gate line end 24 are collectively referred to as a gate wiring. And the storage lines 28a and 28b and the storage electrode 29 are collectively referred to as a storage wiring.

Each of the gate wiring and the storage wiring may be formed of aluminum (Al)-based metal, such as aluminum and an aluminum alloy, silver (Ag)-based metal, such as silver and a silver alloy, copper (Cu)-based metal such as copper and a copper alloy, molybdenum (Mo)-based metal, such as molybdenum and a molybdenum alloy, chrome (Cr), titanium (Ti) or tantalum (Ta). In addition, each of the gate wiring and the storage wiring may have a multi-film structure composed of two conductive films (not shown) with different physical characteristics. One of the two conductive films is formed of metal with low resistivity, such as aluminum-based metal, silver-based metal or copper-based metal, in order to reduce a signal delay or a voltage drop of the gate wiring or the storage wiring. On the other hand, the other one of the conductive films is formed of a different material, in particular, a material having superior contact characteristics with indium tin oxide (ITO) and indium zinc oxide (IZO), such as molybdenum-based metal, chrome, titanium, or tantalum. Good examples of the multi-film structure include a combination of a lower chrome film and an upper aluminum film and a combination of a lower aluminum film and an upper molybdenum film. However, the present invention is not limited thereto. The gate wiring and the storage wiring may be formed of various metal and conductors.

The gate insulation layer 30, which is formed of silicon nitride (SiNx), is disposed on the gate line 22 and the storage wiring.

A semiconductor layer 40 is disposed on the gate insulation layer 30 and is made of hydrogenated amorphous silicon or polycrystalline silicon. The semiconductor layer 40 may have various shapes. For example, the semiconductor layer 40 may be shaped like an island or may be linear. As in the present invention, the semiconductor layer 40 shaped like an island may be formed on the gate electrode 26. Alternatively, if the semiconductor layer 40 is linear, it may be disposed under a data line 62 and extend onto the gate electrode 26.

Ohmic contact layers 55, 56a and 56b are disposed on the semiconductor layer 40. Ohmic contact layers 55, 56a and 56b are island-shaped or linear-shaped. Each of the ohmic contact layers 55, 56a and 56b is formed of a material, such as silicide or n+ hydrogenated amorphous silicon doped with n-type impurities in high concentration. If the ohmic contact layers 55, 56a and 56b are shaped like islands, they are disposed under drain electrodes 66a and 66b and a source electrode 65. If the ohmic contact layers 55, 56a and 56b are linear, they may extend under the data line 62.

The data line 62 and the drain electrodes 66a and 66b are formed on the ohmic contact layers 55, 56a and 56b and the gate insulation layer 30. The data line 62 extends in the second direction, for example, in the vertical direction, and crosses the gate line 22 and the first and second storage lines 28a and 28b to define a pixel. In addition, the source electrode 65 extends like a branch from the data line 62 onto the ohmic contact layers 55, 56a and 56b.

A data line end 68 is formed at an end of the data line 62. The data line end 68 receives a data signal from another layer or an external source and transmits the data signal to the data line 62. A width of the data line end 68 is expanded for connection with an external circuit.

The drain electrodes 66a and 66b are separated from the source electrode 65 and disposed on the ohmic contact layers 56a and 56b with the source electrode 65, which is disposed on the ohmic contact layer 55, therebetween.

A vertically extending portion of the data line 62 is connected to the source electrode 65 and crosses the gate line 22 and the first and second storage lines 28a and 28b.

The data line 62, the data line end 68, and the source electrode 65 are collectively referred to as a data wiring. The data wiring may be formed of chrome, molybdenum-based metal, or refractory metal such as tantalum and titanium. In addition, the data wiring may have a multi-film structure composed of a lower film (not shown), which is formed of refractory metal, and an upper film (not shown) which is formed of a material with low resistivity and is disposed on the lower film. As described above, examples of the multi-film structure may include a combination of a lower chrome film and an upper aluminum film and a combination of a lower aluminum film and an upper molybdenum film. Alternatively, the multi-film structure may be a three-film structure having molybdenum-aluminum-molybdenum films.

The source electrode 65 at least partially overlaps the semiconductor layer 40. In addition, the drain electrodes 66a and 66b at least partially overlap the semiconductor layer 40 while the source electrode 65 is interposed between the drain electrodes 66a and 66b. The ohmic contact layers 55, 56a and 56b exist between the semiconductor layer 40 disposed thereunder and the source electrode 65 and the drain electrodes 66a and 66b disposed thereabove. The ohmic contact layers 55, 56a and 56b reduce contact resistance.

Each of the drain electrodes 66a and 66b has a stick-shaped end, which overlaps the semiconductor layer 40, and wide drain electrode expansion portions which extend from the stick-shaped end.

The passivation layer 70 is formed on the data wiring and the exposed semiconductor layer 40. The passivation layer 70 is formed of an inorganic matter such as silicon nitride or silicon oxide, an organic matter having photosensitivity and superior planarization characteristics, or a low-k dielectric material formed by plasma enhanced chemical vapor deposition (PECVD), such as a-Si:C:O or a-Si:O:F. The passivation layer 70 may be composed of a lower inorganic layer and an upper organic layer in order to protect exposed portions of the semiconductor layer 40 while taking advantage of the superior characteristics of the organic layer. In addition, a red, green or blue color filter layer may be used as the passivation layer 70. In the present embodiment, the passivation layer 70 having a signal-layer structure is described as an example.

A plurality of contact holes 78, 76a and 76b respectively exposing the data line end 68 and the drain electrode expansion portions 67a and 67b are formed in the passivation layer 70. In addition, a contact hole 74 exposing the gate line end 24 is formed in the passivation layer 70 and the gate insulation layer 30. A pixel electrode shaped like a flat board is electrically connected to the drain electrodes 66a and 66b by the contact holes 76a and 76b.

Specifically, the pixel electrode may be split into upper and lower portions with the gate line 22 therebetween and may be made of transparent conductors, such as ITO or IZO, or reflective conductors such as aluminum. More specifically, the pixel electrode may include the first and second sub-pixel electrodes 82a and 82b. The first sub-pixel electrode 82a is physically and electrically connected to the drain electrode 66a by the contact hole 76a. In addition, the first sub-pixel electrode 82a is disposed above the gate line 22 and overlaps the first storage line 28a. On the other hand, the second sub-pixel electrode 82b is electrically and physically connected to the drain electrode 66b by the contact hole 76b. In addition, the second sub-pixel electrode 82b is disposed under the gate line 22 and overlaps the second storage line 28b. The first and second sub-pixel electrodes 82a and 82b are supplied with the substantially the same data signal, i.e., the same data voltage, from the single data line 62.

The first and second sub-pixel electrodes 82a and 82b, to which the same data voltage is applied, generate an electric field together with a common electrode 150 (see FIG. 8) in an upper display panel 2 (see FIG. 8), thereby controlling the arrangement of liquid crystal molecules between the first and second sub-pixel electrodes 82a and 82b and the common electrode 150.

As described above, the first sub-pixel electrode 82a and the first storage line 28a may form a larger storage capacitor Cst than the second sub-pixel electrode 82b and the second storage line 28b. The storage capacitor Cst is connected, in parallel, to a liquid crystal capacitor Clc formed between each of the first and second sub-pixel electrodes 82a and 82b and the common electrode 150. Therefore, the storage capacitor Cst may sustain a voltage applied to each of the first and second sub-pixel electrodes 82a and 82b even after a switching device is turned off and strengthen a voltage sustaining capability. Furthermore, the storage capacitor Cst may control the size of the data voltage applied to each of the first and second sub-pixel electrodes 82a and 82b differently.

An auxiliary gate line end 86 and an auxiliary data line end 88 are formed on the passivation layer 70 and connected to the gate line end 24 and the data line end 68 by the contact holes 74 and 78, respectively. The first and second sub-pixel electrodes 82a and 82b, the auxiliary gate line end 86 and the auxiliary data line end 88 are made of transparent conductors, such as ITO or IZO, or reflective conductors such as aluminum. The auxiliary gate line end 86 and the auxiliary data line end 88 complement adhesiveness of the gate line end 24 and the data line end 68 with an external device and protect the gate line end 24 and the data line end 68.

Referring to FIG. 4, each of first and second sub-pixel electrodes 82a and 82b may be shaped like bent bands. Specifically, a pixel electrode may be split into the first and second sub-pixel electrodes 82a and 82b with a gate line 22 therebetween, and each of the first and second sub-pixel electrodes 82a and 82b may be bent at an angle of approximately 45 or −45 degrees with respect to the gate line 22.

Referring to FIGS. 3 and 4, the first and second sub-pixel electrodes 82a and 82b described above may have different sizes. For example, the first sub-pixel electrode 82a may be smaller than the second sub-pixel electrode 82b. That is, the storage capacitor Cst controls the data voltage applied to the first sub-pixel electrode 82a using a relatively higher grayscale than a grayscale used for the data voltage applied to the second sub-pixel electrode 82b. Thus, the first sub-pixel electrode 82a may be smaller than the second sub-pixel electrode 82b, thereby enhancing lateral visibility of the LCD.

The first sub-pixel electrode 82a may be shorter than the second sub-pixel electrode 82b in an x-axis direction, for example, the horizontal direction. A ratio of the size of the first sub-pixel electrode 82a to the size of the second sub-pixel electrode 82b may be approximately 1:1.5 to 1:2.

An alignment film (not shown) may be coated on the first and second sub-pixel electrodes 82a and 82b and the passivation layer 70.

Hereinafter, the upper display panel 2 and the LCD will be described in detail with reference to FIG. 8. FIG. 8 is a cross-sectional view of the LCD including the lower display panel 1 illustrated in FIG. 3.

Referring to FIG. 8, a black matrix 120, which prevents leakage of light and defines a pixel region, is formed on an insulation substrate 110 made of transparent glass. Here, the black matrix 120 may correspond to regions where the gate line 22 and a thin film transistor of the lower display panel 1 are formed. In addition, the black matrix 120 may prevent the leakage of light caused by splitting of the pixel electrode into the first and second sub-pixels 82a and 82b. The black matrix 120 may be made of metal (metal oxide), such as chrome or chrome oxide, or organic black resist.

In addition, red, green and blue (RGB) color filters 130 may be sequentially arranged in the pixel region between the black matrices 120.

The common electrode 150 formed of a transparent conductive material, such as ITO or IZO, is disposed on the overcoat layer 140. The common electrode 150 may face the first and second sub-pixel electrode 82a and 82b of the lower display panel 1. In addition, the common electrode 150 includes one or more domain partition portions 152, such as apertures or protrusions. The domain partition portions 152 may split a plurality of liquid crystal molecules 5 into a plurality of domains and may pre-tilt the liquid crystal molecules 5 in each domain in a predetermined direction.

In the present embodiment, apertures are formed as the domain partition portions 152. However, the present invention is not limited thereto, and protrusions may be formed at positions of the apertures. Alternatively, the domain partition portions 152 may be formed on the pixel electrode, that is, the first and second sub-pixel electrodes 82a and 82b. Alternatively, the domain partition portions 152 may not be formed in the first and second pixel electrodes 82a and 82b or the common electrode 150, and the liquid crystal molecules 5 may be aligned using rays.

An alignment film (not shown) may be coated on the common electrode 150.

A liquid crystal layer 3 may include the liquid crystal molecules 5 and may be interposed between the upper display panel 2 and the lower display panel 1. When no electric field is applied between the first and second pixel electrodes 82a and 82b and the common electrode 150, directors of the liquid crystal molecules 5 may be aligned perpendicular to the lower and upper display panels 1 and 2, and the liquid crystal molecules 5 may have negative dielectric anisotropy.

The LCD is composed of the above basic structure and elements added to the basic structure, such as a polarizer and a backlight. Here, the polarizer is installed on each of both sides of the basic structure. One of two transmission axes of each polarizer is disposed parallel to the gate line 22, and the other one of the transmission axes is disposed perpendicular to the gate line 22.

If an electric field is applied between the common electrode 150 of the upper display panel 2 and the first and second sub-pixel electrodes 82a and 82b of the lower display panel 1, an electric field perpendicular to the lower and upper display panels 1 and 2 is formed in most regions. However, a horizontal electric field is formed in the vicinity of the domain partition portions 152 of the common electrode 150. The horizontal electric field helps the alignment of the liquid crystal molecules 5 in each domain.

Hereinafter, a method of driving the LCD structured as described above will be described in detail with reference to FIGS. 9 and 10. The present embodiment will be described with reference to FIG. 2 as well as FIGS. 9 and 10 for ease of description.

Figure 9:
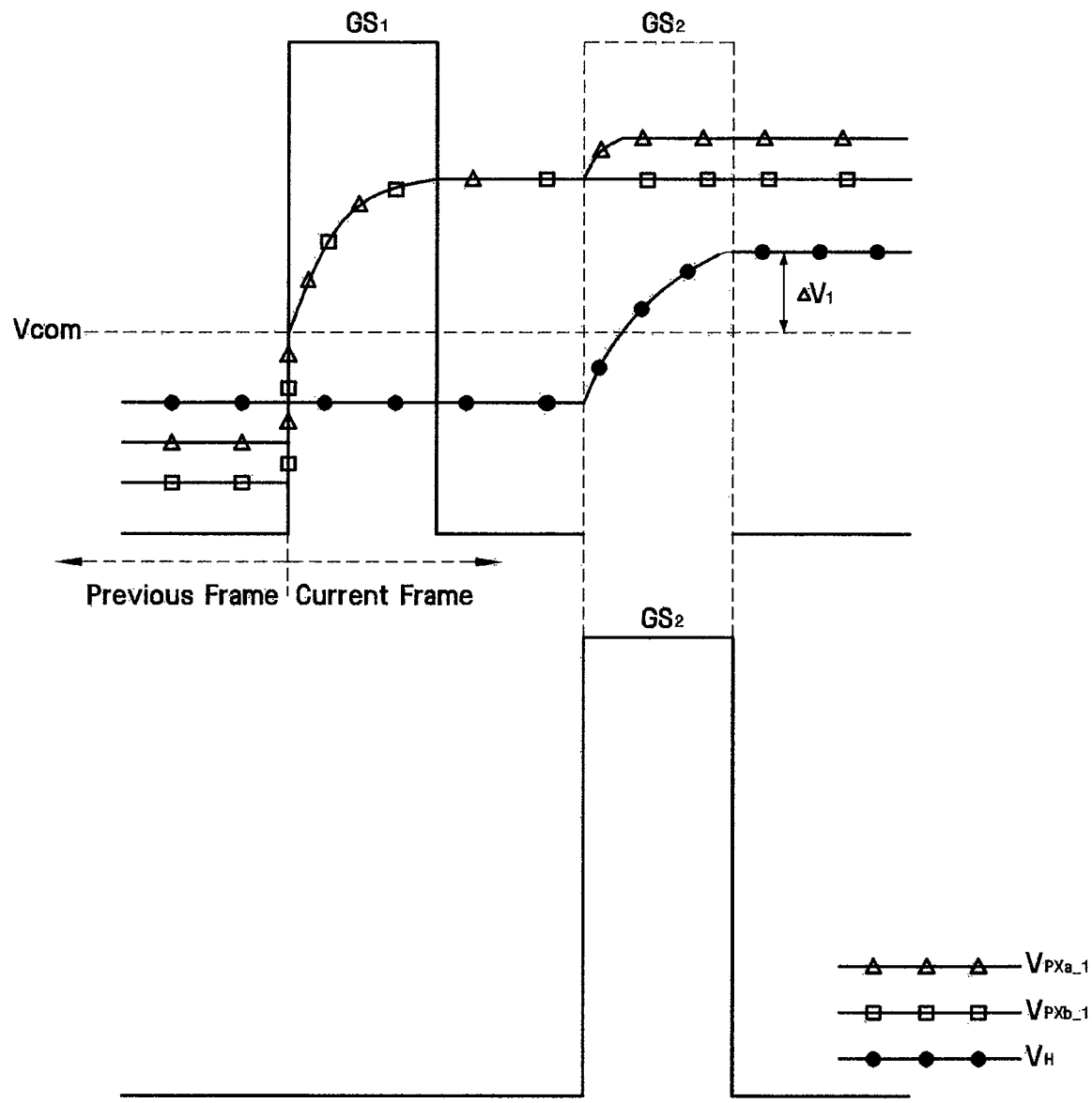
FIGS. 9 and 10 show waveforms of signals applied in a method of driving the LCD according to an exemplary embodiment of the present invention.
Figure 10:
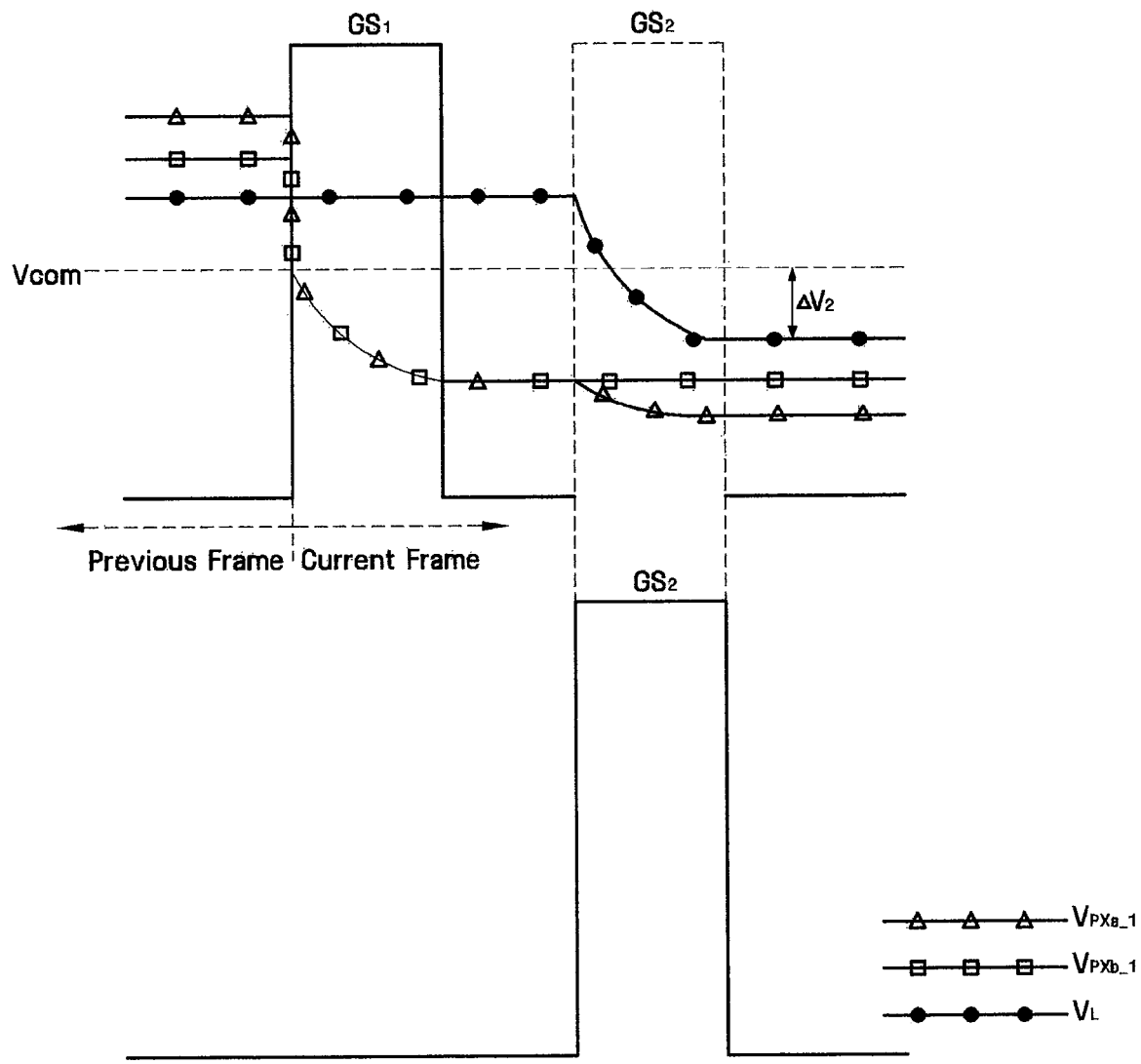

FIGS. 9 and 10 show waveforms of signals according to the operation of the LCD.

As described above with reference to FIGS. 1 through 8, the LCD according to the present embodiment includes the gate lines G1 and G2, the data lines D1 through D3, the first and second sub-pixels PXa and PXb, the first and second storage lines SLa1 and SLb1, and the storage voltage unit 101, which will not be described in detail.

Referring to FIGS. 2 and 9, it is assumed that first and second data voltages $V_{PXa\_1}$ and $V_{PXb\_1}$, which have different sizes and are lower than the common voltage Vcom, are charged in the first and second sub-pixels PXa and PXb during a previous frame operation of the LCD. In addition, it is also assumed that the first and second data voltages $V_{PXa\_1}$ and $V_{PXb\_1}$, which are higher than the common voltage Vcom, are applied from the data line D1 to the first and second sub-pixels PXa and PXb when a first gate signal GS1 is applied to the gate line G1 during a current frame operation of the LCD. While the first gate signal GS1 is on, the first and second sub-pixels PXa and PXb are charged with the first and second data voltages $V_{PXa\_1}$ and $V_{PXb\_1}$.

Of the pair of voltages $V_H$ and $V_L$ provided to the first and second voltage lines 102a and 102b of the storage voltage unit 101, the voltage $V_L$, which is lower than the common voltage Vcom, is applied to the first storage line SLa1 that overlaps the first sub-pixel PXa as the second storage voltage.

If the first gate signal GS1 is turned off while a second gate signal GS2 is turned on, the first storage line SLa1 is connected to the first voltage line 102a by the switching operation of the switching unit 103 of the storage voltage unit 101. Accordingly, the voltage $V_H$, which is higher than the common voltage Vcom, is applied to the first storage line SLa1 as the first storage voltage.

In addition, the first and second data voltages $V_{PXa\_1}$ and $V_{PXb\_1}$, which were charged in the first sub-pixel PXa and the second sub-pixel PXb while the first gate signal GS1 was on, are sustained.

Here, a storage capacitor is formed between the first storage line SLa1 and the first sub-pixel PXa by the voltage $V_H$ which is applied to the first storage line SLa1 and is higher than the common voltage Vcom. The storage capacitor significantly increases the first data voltage $V_{PXa\_1}$ charged in the first sub-pixel PXa as compared to the second data voltage $V_{PXb\_1}$ charged in the second sub-pixel PXb.

Accordingly, the first and second data voltages $V_{PXa\_1}$ and $V_{PXb\_1}$ charged in the first and second sub-pixels PXa and PXb may have different sizes, which, in turn, may adjust an angle at which the liquid crystal molecules 5 (See FIG. 8) are arranged. Consequently, lateral visibility of the LCD can be enhanced.

Here, the switching unit 103 of the storage voltage unit 101 operates in synchronization with a rising edge of the second gate signal GS2. In addition, the voltage $V_H$ applied to the first storage line SLa1 may be higher than the common voltage Vcom. For example, there may be a voltage difference $\Delta V1$ of 2 to 2.5 V between the voltage $V_H$ and the common voltage Vcom.

Due to the voltage $V_H$, the size of the first data voltage $V_{PXa\_1}$ may be increased to become larger than the second data voltage $V_{PXb\_1}$ by a half to a quarter of the size of the voltage $V_H$. For example, it may be assumed that the voltage $V_H$ is 5 V greater than the second storage voltage $V_L$. In this case, the voltage $V_H$ is 2.5 V higher than the common voltage Vcom. In addition, the voltage $V_L$ is 2.5 V lower than the common voltage Vcom. Here, the first data voltage $V_{PXa\_1}$ can be increased by a half to a quarter of the voltage $V_H$. That is, the first data voltage $V_{PXa\_1}$ may be increased by approximately 2 to 2.5 V with respect to the second data voltage $V_{PXb\_1}$.

As described above with respect to FIG. 2, a storage capacitor may also be formed between the second storage line SLb1 and the second sub-pixel PXb. In addition, when the LCD is driven, the second storage line SLb1 is connected to the second voltage line 102b by the switching operation of the switching unit 103. Accordingly, the voltage $V_L$, which is lower than the common voltage Vcom, is applied to the second storage line SLb1. As a result, the second data voltage $V_{PXb\_1}$ of the second sub-pixel PXb may become relatively smaller than the first data voltage $V_{PXa\_1}$ due to the voltage $V_L$ applied to the second storage line SLb1. In the present embodiment, a change in the size of the second data voltage $V_{PXb\_1}$ due to the storage capacitor formed by the second storage line SLb1 and the second sub-pixel PXb overlapping each other is omitted.

Hereinafter, another method of driving the LCD will be described with reference to FIGS. 2 and 10.

Referring to FIGS. 2 and 10, it is assumed that the first and second data voltages $V_{PXa\_1}$ and $V_{PXb\_1}$, which have different sizes and are higher than the common voltage Vcom, are charged in the first and second sub-pixels PXa and PXb during a previous frame operation of the LCD. In addition, it is also assumed that the first and second data voltages $V_{PXa\_1}$ and $V_{PXb\_1}$, which are lower than the common voltage Vcom, are applied from the data line D1 to the first and second sub-pixels PXa and PXb when the first gate signal GS1 is applied to the gate line G1 during a current frame operation of the LCD. During a cycle of the first gate signal GS1, the first and second sub-pixels PXa and PXb are charged with the first and second data voltages $V_{PXa\_1}$ and $V_{PXb\_1}$.

The voltage $V_H$, which is higher than the common voltage Vcom, is applied to the first storage line SLa1 that overlaps the first sub-pixel PXa.

If the first gate signal GS1 is turned off while the second gate signal GS2 is turned on, the first storage line SLa1 is connected to the second voltage line 102b by the switching operation of the switching unit 103 of the storage voltage unit 101. Accordingly, the voltage $V_L$, which is lower than the common voltage Vcom, is applied to the first storage line SLa1.

In addition, the first and second data voltages $V_{PXa\_1}$ and $V_{PXb\_1}$, which were charged in the first sub-pixel PXa and the second sub-pixel PXb while the first gate signal GS1 was on, are sustained.

Here, a storage capacitor is formed between the first storage line SLa1 and the first sub-pixel PXa by the voltage $V_L$ which is applied to the first storage line SLa1 and is lower than the common voltage Vcom. The storage capacitor significantly increases the first data voltage $V_{PXa\_1}$ charged in the first sub-pixel PXa as compared to the second data voltage $V_{PXb\_1}$ charged in the second sub-pixel PXb.

Accordingly, the first and second data voltages $V_{PXa\_1}$ and $V_{PXb\_1}$ charged in the first and second sub-pixels PXa and PXb may have different sizes, which, in turn, may adjust the angle at which the liquid crystal molecules 5 are arranged. Consequently, lateral visibility of the LCD can be enhanced.

The switching unit 103 of the storage voltage unit 101 operates in synchronization with a rising edge of the second gate signal GS2. In addition, the voltage $V_L$ applied to the first storage line SLa1 may be higher than the common voltage Vcom. For example, there may be a voltage difference $\Delta V2$ of 2 to 2.5 V between the voltage $V_L$ and the common voltage Vcom. Here, there may be substantially the same voltage difference ($\Delta V1 = \Delta V2$) between the common voltage Vcom and each of the voltage $V_H$ described above with reference to FIG. 9 and the voltage $V_L$.

Due to the voltage $V_L$, the size of the first data voltage $V_{PXa\_1}$ may be increased to become larger than the second data voltage $V_{PXb\_1}$ by a half to a quarter of the size of the voltage $V_L$. For example, it is assumed that the first storage voltage $V_H$ is 5 V greater than the voltage $V_L$. In this case, the voltage $V_L$ is 2.5 V lower than the common voltage Vcom. In addition, the voltage $V_H$ is 2.5 V higher than the common voltage Vcom. Here, the first data voltage $V_{PXa\_1}$ can be increased by a half to a quarter of the voltage $V_L$. That is, the first data voltage $V_{PXa\_1}$ may be increased by approximately 2 to 2.5 V with respect to the second data voltage $V_{PXb\_1}$.

Referring to FIGS. 2, 9 and 10, each pixel PX including the first and second sub-pixels PXa and PXb may be inversely driven with respect to the common voltage Vcom. In the present embodiment, a dot inversion driving method will be described as an example. In the dot inversion driving method, every two adjacent pixels PX have opposite signs, that is, a positive polarity and a negative polarity, with respect to the common voltage Vcom during one frame operation of the LCD.

Specifically, as illustrated in FIG. 9, during one frame of the LCD, the first and second sub-pixels PXa and PXb that form one pixel PX may be driven with the positive polarity with respect to the common voltage Vcom. On the other hand, as illustrated in FIG. 10, during one frame of the LCD, the first and second sub-pixels PXa and PXb that form another pixel PX may be driven with the negative polarity with respect to the common voltage Vcom.

Here, if one of the adjacent pixels PXs operates with a positive polarity with respect to the common voltage Vcom, the other pixel PX may operate with a negative polarity with respect to the common voltage Vcom.

As described above, in an LCD and a method of driving the same according to the present invention, voltages having opposite phases are selectively switched on and thus applied to a storage line, which overlaps a pixel, at a cycle of at least one frame. Therefore, even if one horizontal time period of the LCD is shortened since the LCD is driven at high speed, an RC delay that occurs in the storage line can be reduced. In addition, since one pixel is partitioned into a pair of sub-pixels having different sizes, lateral visibility of the LCD can be enhanced.

While the present disclosure of invention has been provided as particularly shown and described with reference to exemplary embodiments, it will be understood by those of ordinary skill in the art in view of the present disclosure that various changes in form and detail may be made therein without departing from the spirit and scope of the present teachings. The exemplary embodiments should be considered in a descriptive sense only and not for purposes of limitation.

What is claimed is:

1. A liquid crystal display (LCD) comprising:
   a gate line formed on a first insulation substrate and extending in a first direction;
   a data line insulated from the gate line and extending in a different second direction;
   a pixel electrode structure comprising a first sub-pixel electrode connected to the gate line and the data line by way of a first transistor and a second sub-pixel electrode connected to the gate line and the data line by way of a second transistor;
   first and second voltage lines configured for receiving corresponding first and second storage voltages provided as alternating signals having opposite phases and suppliable from an external source;
   first and second storage lines respectively overlapping the first and second sub-pixel electrodes of the pixel electrode structure to form at the overlaps respective but differently sized first and second storage capacitors; and
   first and second switching units;
   wherein the first storage line is selectively connected at different times to one or the other of the first and second voltage lines by way of the first switching unit,
   wherein the second storage line is selectively connected at said different times to the other or the one of the first and second voltage lines by way of the second switching unit, whereby the first switching unit connects the first storage line to the first voltage line when the second switching unit connects the second storage line to the second voltage line, and whereby the first switching unit connects the first storage line to the second voltage line when the second switching unit connects the second storage line to the first voltage line.

2. The LCD of claim 1, further comprising a gate driver configured to apply respective gate signals to said first recited and other gate lines of the LCD,
   wherein after a gate signal is applied to the first recited gate line by the gate driver, the first and second switching units swap their application of the first and second storage voltages respectively to the first and second storage lines in synchronization with a next gate signal that is applied to a next gate line by the gate driver.

3. The LCD of claim 2, wherein the first and second switching units are synchronized with a rising edge of the next gate signal.

4. The LCD of claim 1, wherein a voltage difference between each of the first and second storage voltages and a common voltage is 2 to 2.5 V.

5. The LCD of claim 1, wherein the first sub-pixel electrode is smaller than the second sub-pixel electrode.

6. The LCD of claim 1, wherein respective first and second data voltages develop on the first and second sub-pixel electrodes in response to respective couplings of the first and second storage lines to the corresponding first and second voltage lines, and the data voltage developed on the first sub-pixel electrode is different than the data voltage developed on the second sub-pixel electrode.

7. The LCD of claim 5, wherein a ratio of a size of the first sub-pixel electrode to a size of the second sub-pixel electrode is 1:1.5 to 1:2.

8. The LCD of claim 5,
   and further comprising, in addition to the first recited pixel electrode structure, successive and similarly structured additional pixel electrode structures;
   wherein the respective first and second sub-pixel electrodes of adjacent ones of the successive pixel electrode structures are alternately arranged relative to one another.

9. The LCD of claim 5, further comprising an insulation layer between the first and second sub-pixel electrodes and the first and second storage lines, wherein a thickness of the insulation layer interposed between the first sub-pixel electrode and the first storage line is less than the thickness of the insulation layer interposed between the second sub-pixel electrode and the second storage line.

10. The LCD of claim 1, wherein the first and second sub-pixel electrodes are separated from each other with the gate line therebetween.

11. The LCD of claim 1, wherein the first and second sub-pixel electrodes are bent at an angle of substantially −45 or 45 degrees with respect to the gate line.

12. A method of driving an LCD, the method comprising:
    applying a gate signal to a gate line;
    applying a data voltage to a data line to charge a pixel electrode structure comprised of first and second sub-pixel electrodes, where the first and second sub-pixel electrodes are electrically isolated from one another and are respectively overlapped by first and second storage lines, but a capacitive coupling of one of the first and second sub-pixel electrodes to its overlapping storage line is substantially greater than that of the other sub-pixel electrode to its overlapping storage line;
    applying respective first and second storage voltages, whose phases are inverted at a cycle of at least one frame, to the first and second storage lines respectively, wherein the applying of the first and second storage voltages comprises providing a pair of voltages having opposite phases from an external source, and applying the pair of voltages, which are selectively switched on by first and second switching units, to the first and second storage lines as the first and second storage voltages;
    using the first switching unit to connect the first storage line to the first voltage line when using the second switching unit to connect the second storage line to the second voltage line; and
    using the first switching unit to connect the first storage line to the second voltage line when using the second switching unit to connect the second storage line to the first voltage line;
    whereby a difference in amplitudes of the respective data voltages charged in the first and second sub-pixel electrodes is created by using the first and second storage voltages as capacitively coupled respectively to the first and second sub-pixel electrodes, wherein the first switching unit and the second switching unit apply the first and second storage voltage to the first and second storage line at a cycle of at least one frame, and wherein the frames include a plurality of horizontal time periods.

13. The method of claim 12, wherein the first and second switching units invert the phases of the first and second storage voltages in synchronization with a next gate signal that is applied to a next gate line neighboring the gate line.

14. The method of claim 13, wherein the first and second switching units are synchronized with a rising edge of the next gate signal.

15. The method of claim 12, wherein a ratio of a size of the first sub-pixel electrode to a size of the second sub-pixel electrode is 1:1.5 to 1:2.

16. The method of claim 12, wherein, in the adjusting of the amplitudes of the data voltages charged in the first and second sub-pixel electrodes, the data voltages charged in the first and second sub-pixel electrodes are respectively increased by a half to a quarter of the first and second storage voltages.

17. The method of claim 12, wherein the pixel electrode structure is driven in accordance with a dot-inversion type polarity inversion scheme.

18. A liquid crystal display (LCD) device comprising:

a plurality of gate lines formed on a first insulation substrate and extending thereon in a first direction;

a plurality of data lines insulated from the gate lines and extending in a different second direction;

a plurality of pixel electrode structures each respectively comprising a first sub-pixel electrode connected to a corresponding one of the gate lines and a corresponding one of the data lines by way of a respective first transistor and comprising a second sub-pixel electrode connected to the corresponding one of the gate lines and to the corresponding one of the data lines by way of a respective second transistor; and for each given gate line, a corresponding set of first and second storage lines respectively extending in the first direction and respectively disposed at respective opposed sides of the given gate line, the first and second storage lines respectively overlapping the first and second sub-pixel electrodes of the pixel electrode structures that operatively couple to the given gate line, said overlappings defining at the areas of overlap respective capacitive couplings between the overlapped sub-pixel electrodes and the overlapping storage lines, where for each pixel electrode structure, the capacitive coupling of one of the first and second sub-pixel electrodes to its overlapping storage line is substantially greater than the capacitive coupling of the other sub-pixel electrode to its overlapping storage line.

* * * * *